(12) United States Patent
Vilaseca Ricart et al.

(10) Patent No.: US 12,423,829 B2
(45) Date of Patent: Sep. 23, 2025

(54) METHOD, SYSTEM AND COMPUTER PROGRAMS FOR THE AUTOMATIC COUNTING OF THE NUMBER OF INSECTS IN A TRAP

(71) Applicants: UNIVERSITAT POLITECNICA DE CATALUNYA, Barcelona (ES); COMERCIAL QUÍMICA MASSÓ, SA, Barcelona (ES)

(72) Inventors: Meritxell Vilaseca Ricart, Terrassa (ES); Fernando Díaz Doutón, Terrassa (ES); Francisco Javier Burgos Fernández, Sant Feliu de Guixols (ES); Carlos Enrique García Guerra, Terrassa (ES); Albert Virgili Olive, Barcelona (ES); Abel Antonio Zaragoza Ballesté, Barcelona (ES)

(*) Notice: Subject to any disclaimer, the term of this patent is extended or adjusted under 35 U.S.C. 154(b) by 396 days.

(21) Appl. No.: 17/915,037

(22) PCT Filed: Mar. 17, 2021

(86) PCT No.: PCT/EP2021/056775
§ 371 (c)(1),
(2) Date: Sep. 27, 2022

(87) PCT Pub. No.: WO2021/191012
PCT Pub. Date: Sep. 30, 2021

(65) Prior Publication Data
US 2023/0162365 A1     May 25, 2023

(30) Foreign Application Priority Data

Mar. 27, 2020   (EP) .................................. 20382241

(51) Int. Cl.
*G06T 7/136*     (2017.01)
*G06T 7/11*      (2017.01)
(Continued)

(52) U.S. Cl.
CPC ................ *G06T 7/136* (2017.01); *G06T 7/11* (2017.01); *G06T 7/70* (2017.01); *G06T 7/80* (2017.01);
(Continued)

(58) Field of Classification Search
CPC ...... G06V 10/143; G06V 10/28; G06V 10/30; G06V 10/60; G06V 20/66; G06V 20/52;
(Continued)

(56) References Cited

U.S. PATENT DOCUMENTS 7,496,228 B2 *   2/2009   Landwehr .............. G06V 10/46
                                                           382/165
11,003,908 B2 *  5/2021   Koch ...................... G06F 18/24
(Continued)

OTHER PUBLICATIONS

L. Yuan, Y. Huang, R. W. Loraamm, C. Nie, J. Wang, J. Zhang, Spectral analysis of winter wheat leaves for detection and differentiation of diseases and insects, Field Crops Research, vol. 156, 2014, pp. 199-207, ISSN 0378-4290, https://doi.org/10.1016/j.fcr.2013.11.012. (Year: 2014).*

(Continued)

*Primary Examiner* — Chan S Park
*Assistant Examiner* — Paulo Andres Garcia
(74) *Attorney, Agent, or Firm* — Eugenio J. Torres-Oyola; Victor M. Rodriguez-Reyes; Rafael Rodriguez-Muriel

(57) ABSTRACT

A method and system are proposed for the automatic counting of the number of insects in a trap. The method comprises acquiring, using an acquisition system, a plurality of spectral images of a trap or of a portion of the trap, the spectral images being acquired for at least two different quasi-monochromatic spectral ranges after having sequentially illuminated the trap, or portion of the trap, with light at said two quasi-monochromatic spectral ranges. The trap, or portion of the trap, contains a series of objects adhered thereto, including insects, and optionally other particles. In addition, (Continued)

the method comprises counting, using a processor, the number of insects of a first type through the detection and differentiation of the insects of the first type taking spectral and morphological parameters thereof into account.

14 Claims, 4 Drawing Sheets

(51) Int. Cl.
| | |
|---|---|
| G06T 7/70 | (2017.01) |
| G06T 7/80 | (2017.01) |
| G06V 10/143 | (2022.01) |
| G06V 10/28 | (2022.01) |
| G06V 10/30 | (2022.01) |
| G06V 10/60 | (2022.01) |
| G06V 20/52 | (2022.01) |
| G06V 20/66 | (2022.01) |
| G06V 40/10 | (2022.01) |

(52) U.S. Cl.
CPC ............ *G06V 10/143* (2022.01); *G06V 10/28* (2022.01); *G06V 10/30* (2022.01); *G06V 10/60* (2022.01); *G06V 20/52* (2022.01); *G06V 20/66* (2022.01); *G06V 40/103* (2022.01); *G06T 2207/10152* (2013.01); *G06T 2207/30242* (2013.01)

(58) Field of Classification Search
CPC ......... G06V 40/103; G06T 7/136; G06T 7/11; G06T 7/70; G06T 7/80; G06T 7/174; G06T 2207/10152; G06T 2207/30242
See application file for complete search history.

(56) References Cited

U.S. PATENT DOCUMENTS

| | | | | |
|---|---|---|---|---|
| 11,695,826 | B2* | 7/2023 | Wikoff | H04L 65/102 709/228 |
| 2019/0034736 | A1* | 1/2019 | Bisberg | A01G 7/00 |
| 2019/0327951 | A1* | 10/2019 | Selvig | G06V 20/52 |

OTHER PUBLICATIONS

Burgos-Fernandez FJ, Vilaseca M, Perales E, Chorro E, Marta-nez-Verda FM, Fernandez-Dorado J, Pujol J. Validation of a gonio-hyperspectral imaging system ... Appl Opt. Sep. 1, 2017;56(25):7194-7203. doi: 10.1364/AO.56.007194 (Year: 2017).*

K. Espinoza, D. L. Valera, J. A. Torres, A. LÃ³pez, F. D. Molina-Aiz, Combination of image processing . . . , Computers and Electronics in Agriculture, vol. 127, 2016, pp. 495-505, ISSN 0168-1699, https://doi.org/10.1016/j.compag.2016.07.008. (Year: 2016).*

Graphical Abstract, from https://www.sciencedirect.com/science/article/pii/S0168169916304823?via%3Dihub#f0025 (Year: 2016).*

C. Xia, T. Chon, Z. Ren, J. Lee, Automatic identification and counting of small size pests . . . , Ecological Informatics, vol. 29, Part 2, 2015, p. 139-146, ISSN 1574-9541, https://doi.org/10.1016/j.ecoinf.2014.09.006. (Year: 2015).*

J. Cho, J. Choi, M. Qiao, C.W. Ji, H. Y. Kim, K.B. Uhm, T.S. Chon Automatic identification of whiteflies, aphids and thrips in greenhouse based on image analysis Int. J. Math. Comput. Simul., 346 (246) (2007), p. 244 (Year: 2007).*

Z. Wang, K. Wang, Z. Liu, X. Wang, S. Pan, A Cognitive Vision Method for Insect Pest Image Segmentation, IFAC—PapersOnLine, vol. 51, Issue 17, 2018, p. 85-89, ISSN 2405-8963, https://doi.org/10.1016/j.ifacol.2018.08.066. Otsu, K-mean (Year: 2018).*

Ghods, Sara & Shojaeddini, Vahhab. (2015). A novel automated image analysis method for counting the population of whiteflies on leaves of crops. Journal of Crop Protection. 5. 59-73. 10.18869/modares.jcp.5.1.59. (Year: 2015).*

B. Grieve, C. Veys, J. Dingle, J. Colvin and J. Nwezeobi, "Portable, in-field, multispectral imaging sensor for real-time detection of insect viral-vectors," 2017 IEEE Sensors, Glasgow, UK, 2017, pp. 1-3, doi: 10.1109/ICSENS.2017.8234206. (Year: 2017).* https://ncipmhort.cfans.umn.edu/ipm-identifying-pests/greenhouse-integrated-pest-management-ipm/greenhouse-nursery-insect-pest-id, contains size, family information for variety of analogous pest insects in agriculture, see Insect and Related Pests of Flowers and Foliage Plants. Baker, J.R. ed. 1994. (Year: 1994).*

J. Fennell, C. Veys, J. Dingle, J. Nwezeobi, S. van Brunschot, J. Colvin, B. Grieve, A method for real-time classification of insect vectors . . . , Plant Methods, vol. 14, 2018, doi: 10.1186/s13007-018-0350-3 (Year: 2018).*

Ahmad, Mohd Najib & Mohamed Shariff, Abdul Rashid & Mslim, Ramle. (2018). Monitoring insect pest infestation via different spectroscopic techniques. Applied Spectroscopy Reviews. 53. 1-18. 10.1080/05704928.2018.1445094. (Year: 2018).*

Hydrothermal alteration mapping and structural features in the Guelma basin (Northeastern Algeria): contibution of ladsat-8 data (Arabian Journal of Geosciences—2019).

* cited by examiner

METHOD, SYSTEM AND COMPUTER PROGRAMS FOR THE AUTOMATIC COUNTING OF THE NUMBER OF INSECTS IN A TRAP

FIELD OF THE INVENTION

The present invention generally relates to techniques for the automatic counting of insects in traps. In particular, the invention relates to a method, a system and computer programs for the automatic counting of insects, for example the California red scale, amongst others, from the acquisition of spectral images in two or more different quasi-monochromatic spectral regions by means of a spectral imaging system, and the subsequent analysis of intensities in said regions and morphological properties of the insects.

BACKGROUND OF THE INVENTION

Several techniques exist for the detection of insects in plague control, but one of the most widespread consists in the use of traps formed by cardboard sheets with adhesive and pheromones to attract the insects and trap them. These techniques require significant human involvement as the counting of the insects in the traps is carried out manually from the counting of the insects based on a grid which the traps usually include and the aid of some optical magnification system (magnifying glass or microscope) in order to make said task easier.

Currently, commercial instruments also exist based on cameras which carry out the detection task in a more automatic manner, such as Trapview [1], the DTN Smart Trap [2] device and/or the Semios [3] trap, but all of these instruments are mainly focused on insects of the Lepidoptera, Coleoptera and Arthropoda orders, which have a relatively large size (of several centimetres).

In addition, some patents and/or patent applications are known in this field.

For example, patent application CN107484732A [4] discloses a device and a methodology for controlling plagues by means of the use of visible light (400 nm-700 nm) and by means of the measurement of the spectrum emitted by the insects thanks to the optical sensor without forming an image, thus, without spatial resolution. The light source is also used to kill the insects.

Patent application US20190000059-A1 [5] describes various spectrometric techniques for the detection of insects such as mosquitos, flies and bedbugs. These consist in the use of stroboscopic illumination, lasers, spectrometers and cameras combined with different types of processors for the identification of the insects.

Patent application GB2480496-A [6] mainly focuses on the plague control of a mite (*Varroa* mite) which affects beehives. The described device uses multispectral illumination based on light emitting diodes (LEDs) in the range from 450 nm to 1000 nm and a CCD (Charge Coupled Device) type camera. In addition, a laser (650 nm-1000 nm) is used to eliminate the plagues.

Patent application CN106489876-A [7] discloses a hyperspectral system of scan-derived images for detecting worms within rice grains. It also includes elements to eliminate the plague.

Patent application US20190034736-A1 [8] discloses a system and method for identifying the number of insects in a horticultural area. Such system comprises a digital camera to capture images of the horticultural area, a device processor and a non-transitory computer readable medium storing instructions executable by the device processor to capture, using the digital camera, a first digital image of a horticultural area containing an insect trap, isolate a portion of the first digital image using the trap detection parameters, the portion of the first digital image corresponding to the insect trap, perform automated particle detection on the portion of the first digital image according to the insect detection parameters to identify regions of pixels in the portion of the first digital image that have the insect recognition color and that pass filter criteria, determine a cardinality of insects on the first object based on a number of identified regions of pixels, store the cardinality of insects in association with the first digital image and provide the cardinality of insects for display in a graphical user interface.

REFERENCES

[1] EP3482630 "Method, system and computer programme for performing a pest forecast".
[2] https://www.dtn.com/agriculture/agribusiness/dtn-smart-trap/.
[3] US2019364871A1 "Arthropod trapping apparatus and method".
[4] CN107484732A "Device and method for full-automatically counting number of culled insects in field and culling insects in field".
[5] US20190000059 "Automated multispectral detection, identification and remediation of pests and disease vectors".
[6] GB2480496 "Method and apparatus for the monitoring and control of pests in honeybee colonies".
[7] CN106489876 "High-spectral-imaging-based field pest monitoring and trapping device".
[8] US20190034736A1 "System and Method for Identifying a Number of Insects in a horticultural Area."

SUMMARY OF THE INVENTION

Embodiments of the present invention provide, according to a first aspect, a method for the automatic counting of the number of insects in a trap. The method comprises the acquisition, by means of an acquisition system, of a plurality of spectral images of a trap, or of a portion of the trap. The spectral images are acquired for at least two different quasi-monochromatic spectral ranges, a first quasi-monochromatic spectral range and a second quasi-monochromatic spectral range, after having sequentially illuminated (i.e. multiplexed illumination) the trap, or a portion of the trap, with light at said two different quasi-monochromatic spectral ranges. The trap, or portion of the trap, contains a series of objects adhered thereto, for example, one or several types of insects, and optionally other particles, generally petals, leaves, dust or other types of dirt.

In particular, the second quasi-monochromatic spectral range comprises greater wavelengths than the first spectral range.

In addition, the method comprises the counting, by means of at least one processor, of the number of insects of a first type of said insects included in the trap, or portion of the trap, through the detection and differentiation of the insects of said first type, taking spectral and morphological parameters thereof into account.

In particular, the first type of insects is the California red scale, which has a very small size (approximately 1 mm$^2$ and with an approximately circular shape). In this particular case, the first quasi-monochromatic spectral range is comprised between 300-500 nm and the second quasi-monochromatic spectral range is comprised between 600-900 nm.

In an embodiment, the counting comprises executing a first algorithm on at least one of the acquired spectral images in one of the two different quasi-monochromatic spectral ranges applying an intensity threshold to said spectral image, providing a first mask as a result with values equal to 1 for the image pixels corresponding to the background and equal to 0 for the image pixels which comprise objects; executing a second algorithm on said first mask applying an area threshold to a number of areas of the first mask with values equal to 0 and assigning a value of 1 to the areas with an area value below said area threshold, providing a second mask as a result; calculating a parameter, termed REDIN, which relates an intensity value of the two acquired spectral images based on their spectral range, the REDIN parameter being applied in a pixel-by-pixel base in the acquired spectral images, obtaining a REDIN image as a result; applying the second mask on the obtained REDIN image, providing a new image; and executing a third algorithm on said provided new image, wherein the objects of the trap, or portion of the trap, with a value of the REDIN parameter greater than or equal to a set threshold value are considered insects of said first type.

The first algorithm can comprise the Otsu, entropy or k-mean methods, amongst others. In particular, the first algorithm is carried out using the spectral image corresponding to the first quasi-monochromatic spectral range.

In an embodiment, the third algorithm also comprises applying a pixel connectivity threshold on the new provided image and using said pixel connectivity threshold for considering if an insect is of the first type or not.

In an embodiment, the method also comprises executing a fourth algorithm, based on eccentricity, wherein the method comprises removing from the new image objects with an eccentricity value greater than a certain threshold value of eccentricity.

Prior to the counting of the insects of the first type, a conditioning/normalizing algorithm can be applied to the acquired spectral images. In an embodiment, the conditioning algorithm comprises calculating the reflectances of the first type of insects from a number of intensity values from each pixel of the acquired spectral images considering the pixel intensities of an original spectral image of the trap, a dark image of the trap (i.e. acquired with no light) and an spectral image of a reference target. In another embodiment, a calibration of the acquisition system is carried out, prior to the acquisition of the plurality of spectral images, wherein the calibration comprises setting the acquisition parameters, and/or illumination, for obtaining equivalent intensity values for both different quasi-monochromatic spectral ranges.

In the proposed method, the illumination and the acquisition can be carried out in a direction perpendicular to the trap, or portion of the trap, or alternatively with a certain angle relative to the trap, or portion of the trap.

Embodiments of the present invention provide, according to a second aspect, a system for the automatic counting of the number of insects in a trap. The system includes a trap which contains a series of objects adhered thereto, wherein the objects include insects of one or several types, and optionally other particles such as dust, among others; one or more illumination devices for sequentially emitting light towards the trap, or towards a portion of the trap, in at least one quasi-monochromatic spectral range; an acquisition system, operatively connected to said one or more illumination devices, for acquiring a plurality of spectral images of the trap, or of the portion of the trap, wherein the plurality of spectral images are acquired for at least two different spectral ranges, a first quasi-monochromatic spectral range and a second quasi-monochromatic spectral range, the second quasi-monochromatic spectral range comprising wavelengths greater than the wavelengths of the first spectral range; and a computing unit which includes one or more processors and at least one memory, wherein said one or more processors are adapted to count the number of insects of a first type of said insects included in the trap, or portion of the trap, through the detection and differentiation of the insects of said first type, taking spectral and morphological parameters thereof into account.

In an embodiment, the system also includes one or more polarizers located in front of the acquisition system and/or illumination device. In addition, the system can also include a scanning system, operatively connected to said one or more illumination devices and/or acquisition system, for carrying out a sequential scanning of other portions of the trap.

In particular, for the counting of the California red scale, the first quasi-monochromatic spectral range is comprised between 300-500 nm and the second quasi-monochromatic spectral range is comprised between 600-900 nm.

Other embodiments of the invention that are disclosed in the present document also include computer program products for carrying out the steps and operations of the method proposed in the first aspect of the invention. More in particular, a computer program product is an embodiment which has a computing system-readable medium which includes code instructions coded therein, which, when executed in at least one processor of a computing system cause the processor to carry out the operations specified in this document as embodiments of the invention.

The invention allows improving the efficiency of the integrated plague control, for example, in citrus production, by improving the precision and the detection speed of the insects.

BRIEF DESCRIPTION OF THE DRAWINGS

The foregoing and other characteristics and advantages will be more clearly understood from the following detailed description of a number of embodiments, which is purely illustrative and not limiting, with reference to the attached drawings, wherein.

DETAILED DESCRIPTION OF THE INVENTION AND OF PREFERRED EMBODIMENTS

A system and methods are provided for the automatic counting of insects, in particular the California red scale, in a trap based on the acquisition and the analysis of spectral and morphological information. In the following description, by way of explanation, several specific details are explained for counting California red scale (*Aonidiella aurantii*, red scale or red lice), in order to provide a thorough understanding of the present invention. In any case, it must be understood that, for counting other insects different from red scale, such as other hemipterans, the order of the different implemented steps and/or of the described quasi-monochromatic ranges and parameters can be modified without departing from the scope of protection of the present invention.

Figure 1:
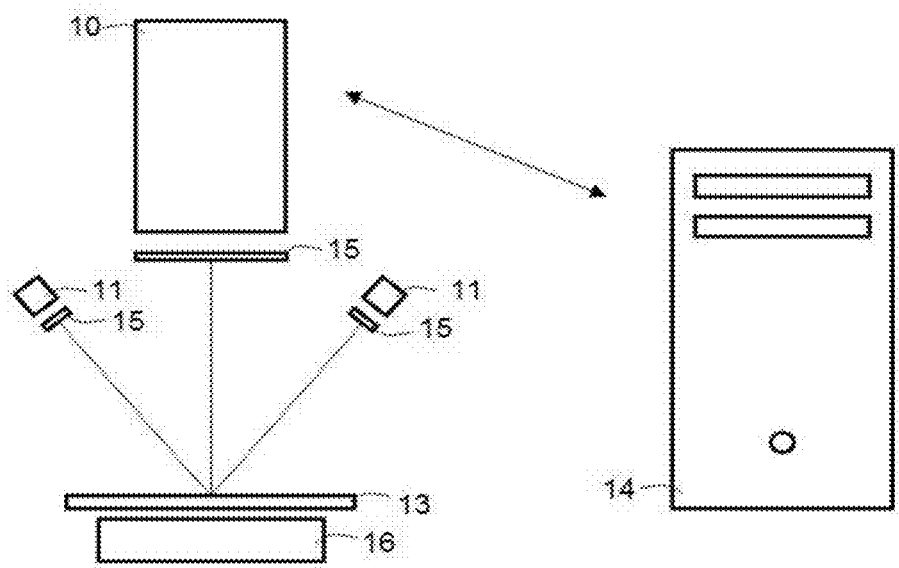
FIG. 1 schematically shows a system (or device) for the automatic counting of insects in a trap, according to an embodiment of the present invention.

Referring to FIG. 1, therein an embodiment of the system (or device) proposed for counting the red scale is shown. According to this embodiment, the system comprises a trap 13; a spectral imaging system including an acquisition system 10, formed by one or more monochrome cameras, CCD or CMOS cameras for example, amongst others, and multiplexed illumination devices 11, in particular light sources which sequentially emit, at least, in one quasi-monochromatic spectral band or range of the electromagnetic spectrum, for example two light emitting diodes LEDs; and a computing unit 14, such as a computer, a (physical or cloud-based) server, a tablet, a smart mobile communication device, or any other programmable hardware device, for executing/implementing algorithms based on computer-aided viewing on the spectral images acquired by the acquisition system 10 taking spectral and morphological parameters of the insects to be detected into account. It must be pointed out that the computing unit 14 can be built into the same system/device or can be remote thereto. The computing unit 14 can communicate with the acquisition system 10 either wirelessly or by means of a wire.

The data or information calculated by the computing unit 14 can also be visualized through the software application o through a webpage, in the computing unit itself, or in a different computing unit and operatively connected/in communication with the computing unit 14.

In particular, the quasi-monochromatic spectral ranges corresponding to the red scale are from 300 nm to 500 nm (first quasi-monochromatic spectral range) and from 600 nm to 900 nm (second quasi-monochromatic spectral range), approximately.

In addition, the system/device of FIG. 1 also includes polarizers 15 arranged in front of the acquisition system 10 and in front of the illumination devices 11; and a scanning system 16, such as a linear shifter, amongst others, which allows for the sequentially assessing of traps 13 of large dimensions. It must be pointed out that these polarizers 15 and the scanning system 16 are optional. In other embodiments, the proposed system/device might not include them or might only include one of them. In addition, it must be pointed out that the proposed system/device only needs to include one illumination device 11 configured to sequentially emit in at least two different quasi-monochromatic spectral ranges.

Figure 2:
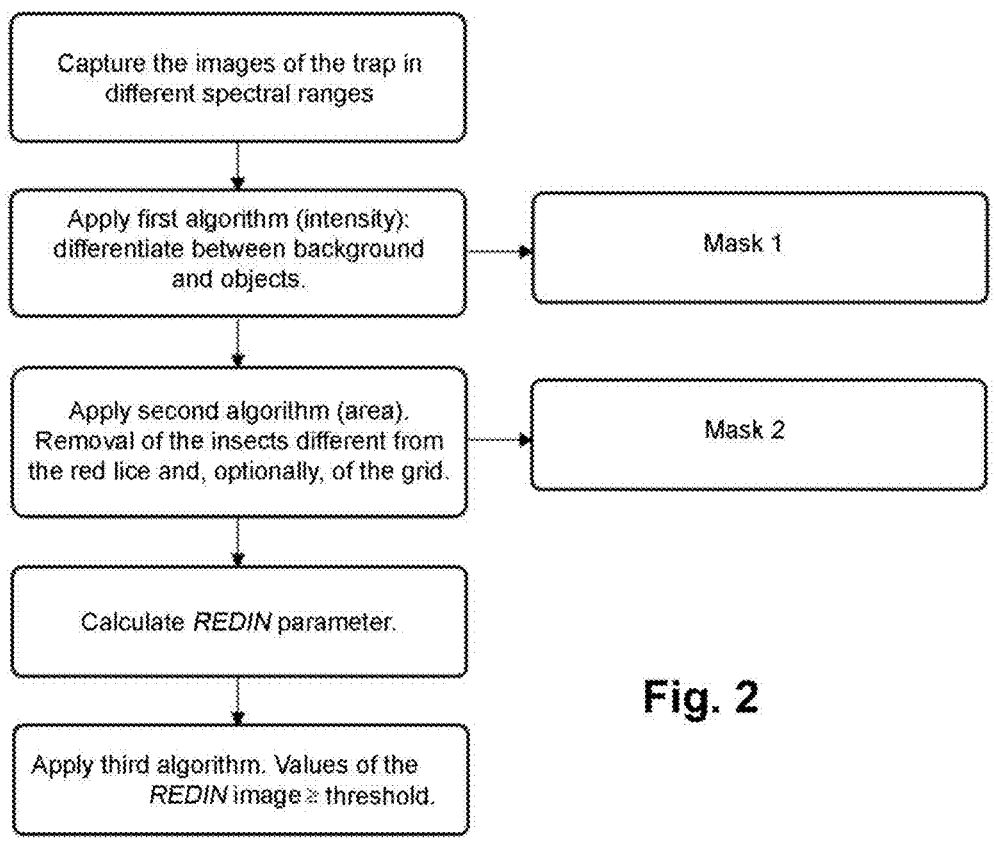
FIG. 2 schematically shows an embodiment of a method for the automatic counting of the California red scale in a trap.
Figure 3:
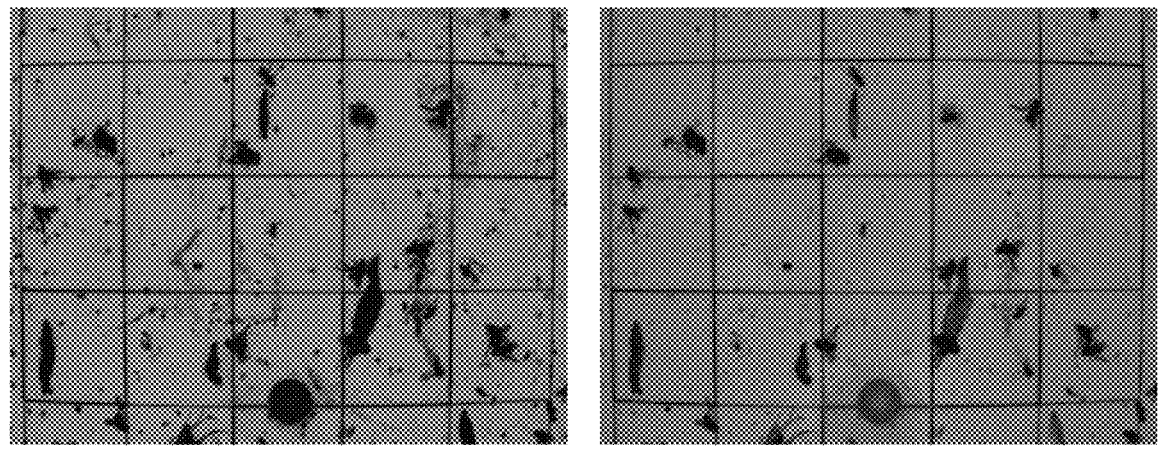
FIG. 3 shows the spectral reflectance images of a region of a trap at two spectral ranges corresponding to short wavelengths (left) and long wavelengths (right).

FIG. 2 shows an embodiment of a method for counting the California red scale. The method of this embodiment comprises acquiring, by means of the acquisition system 10, a series of spectral images of the trap 13, or of a portion of the trap 13. The spectral images are acquired once the trap 13, or a portion thereof, has been illuminated, uniformly, under, at least, both previously described quasi-monochromatic spectral ranges.

The measuring geometry (illumination/observation) can vary to avoid unwanted reflections on the images. This can consist, for example, in illuminating and carrying out the capture in a direction perpendicular to the sample, that is, in the normal direction (d/0°=diffused illumination/capture at 0°); or, in another example, in illuminating at greater angles relative to the normal direction for keeping the reflections from entering the acquisition system 10, such as is shown in FIG. 1, wherein the illumination is carried out positioning the light sources 11 at approximately 45° relative to the normal. Instead of varying the measuring geometry, said polarizers 15 can be used in front of the illumination device/s 11 and/or in front of the acquisition system 10, varying the relative position of their polarization axes for reducing the specular reflections in the images. In particular, the situation wherein the specular reflections are minimized is when the axes of the polarizers 15 are perpendicular to each other.

Continuing the explanation of FIG. 2, subsequent to the image acquisition, the detection and counting of the red scale are undertaken. To that end, first the detection and later removal of the insects from the trap 13 which are not red scale (generally, of greater size), and optionally, the removal of the grid from the trap 13 (often, traps contain a dark grid for helping in the manual counting of the insects and with the aid of an optical magnification system) are carried out making use of the intensity and morphological characteristics of the insects (or other adhered particles, dust, leaves or petals, for example) in the images. To that end, a first algorithm is executed which applies an intensity threshold to at least one of the acquired spectral images in one of the two quasi-monochromatic spectral ranges (in particular, the quasi-monochromatic range corresponding to the shorter wavelengths as it is the one that presents greater contrast between the insects and the trap background).

Figure 4:
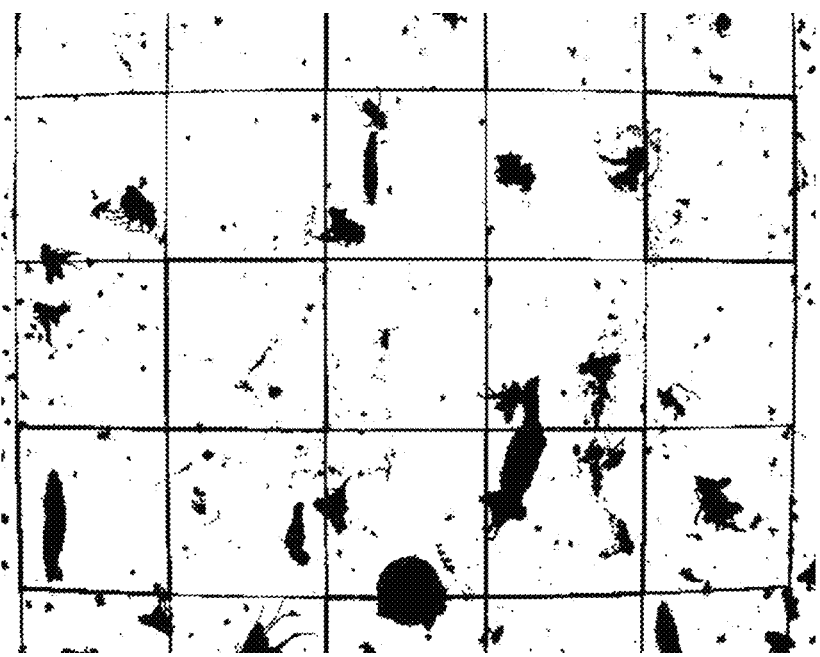
FIG. 4 shows an example of the mask 1 resulting from the application of the first algorithm. The white areas correspond to the background (values=1) and the black areas correspond to a grid/insects/particles (values=0).

Said intensity threshold can be obtained, for example, applying the Otsu method, which is based on the discriminating analysis of the histogram of the image in intensities (digital levels). That is, an intensity limit is established to differentiate between the white background and the objects (grid/insects/particles) thereon, which are darker (that is, the grid (if present), all the insects, including the red scale, and other particles); the values of the image over this threshold are considered background and those below the threshold are considered belonging to the grid/insects/particles. Thus, a first mask is obtained with values equal to 1 for the pixels corresponding to the background and equal to 0 for the pixels wherein objects are present (FIG. 4).

Other alternative methods to the Otsu method are the entropy or k-mean methods, amongst others.

Figure 5:
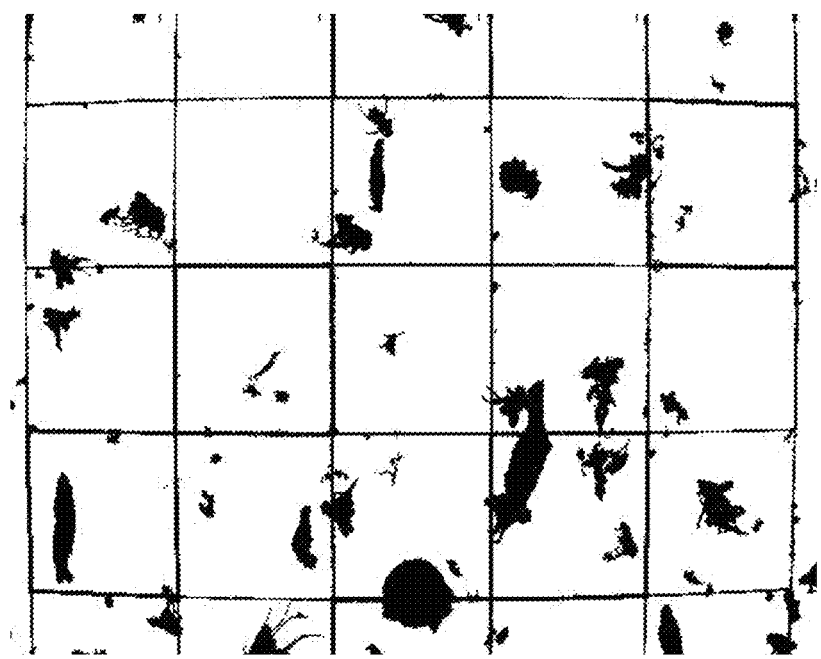
FIG. 5 shows an example of the mask 2 resulting from combining the first and second algorithms (in intensities and area) for removing the insects different from the red scale and the grid from the captured spectral image in the spectral range corresponding to shorter wavelengths. The black regions (values=0) indicate the objects to be removed corresponding to insects and particles of large size and the grid of the trap.

For keeping the red scale in the image and removing the rest of insects of greater size and, optionally, the grid therefrom, a second algorithm is applied on the first mask. An area value is established in the number of pixels and all those objects over this value are kept in the mask, which is established above the size of the red scale. FIG. 5 shows the result of this process for a region of the trap 13. Comparing FIG. 5 with FIG. 4, it is observed that the smaller-sized objects, such as the red scale, are not considered in this second mask so as not to remove them from the images.

Often, the filtering consisting in the application of the first and second algorithms (intensity and area) is not enough as there are objects of the size of the red scale that are not removed effectively, such as, for example, parts of insects that have been fragmented and particles floating in air (dust, plant fragments, etc.) of similar size. For the removal of these, the proposed method comprises calculating a parameter which relates an intensity value of the two acquired images based on their spectral range. To quantify said ratio, known as REDIN, in an embodiment, the following equation is applied on a pixel-by-pixel base in the acquired spectral images:

$$REDIN(i, j) = \frac{I_{\Delta\lambda_2}(i, j)}{I_{\Delta\lambda_1}(i, j)},$$

wherein $I_{\Delta\lambda_1}(i,j)$ and $I_{\Delta\lambda_2}(i,j)$ are the pixel (i,j) intensities of the acquired images in the quasi-monochromatic spectral range corresponding to the short and long wavelengths, respectively; REDIN (i,j) is the resulting image which contains the values of the division of the image intensities at said wavelengths. It should be noted that in other embodiments, the REDIN parameter can be computed using other mathematical/algorithmic equations provided that the latter relate the intensity value of the acquired images in the two different spectral quasi-monochromatic ranges. In addition, a second mask shown in FIG. 5 is applied to this image (REDIN).

Figure 6:
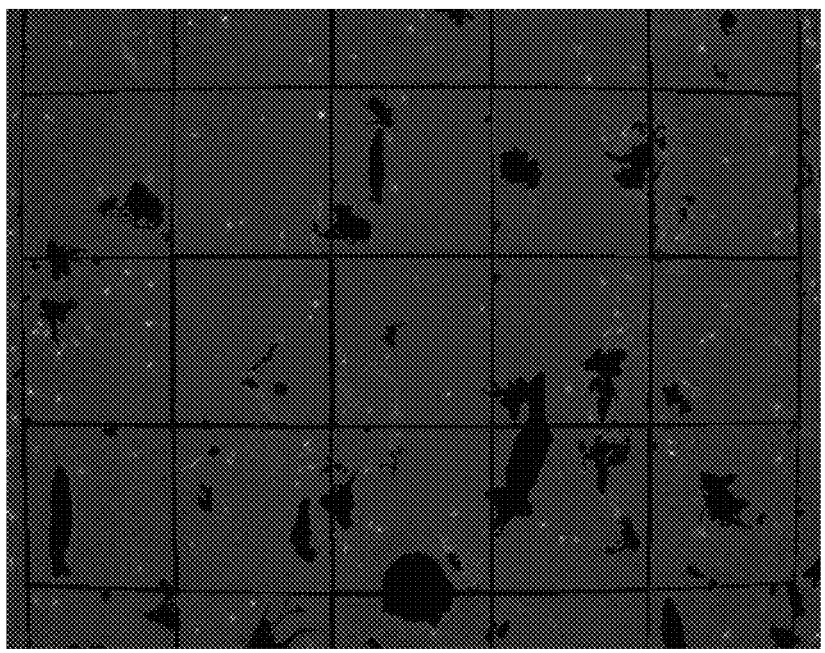
FIG. 6 shows an example of a REDIN image once applied to the mask of FIG. 5.

FIG. 6 shows an example of the REDIN image once the masks are applied, wherein mainly the red scale with high intensity (white dots) are distinguished, whereas the other insects, and optionally the grid, have been removed (black areas).

Once the REDIN image has been calculated and the referred masks have been applied, a new threshold is defined based on the spectral properties which allow to distinguish the red scale from other insects. To that end, a third algorithm is executed which establishes an intensity threshold on REDIN to locate the red scale with greater precision. In an embodiment, a threshold value of 3 is established. Therefore, the objects of the trap 13, or portion of the trap 13, with a REDIN parameter value 3 are considered red scale.

Figure 7:
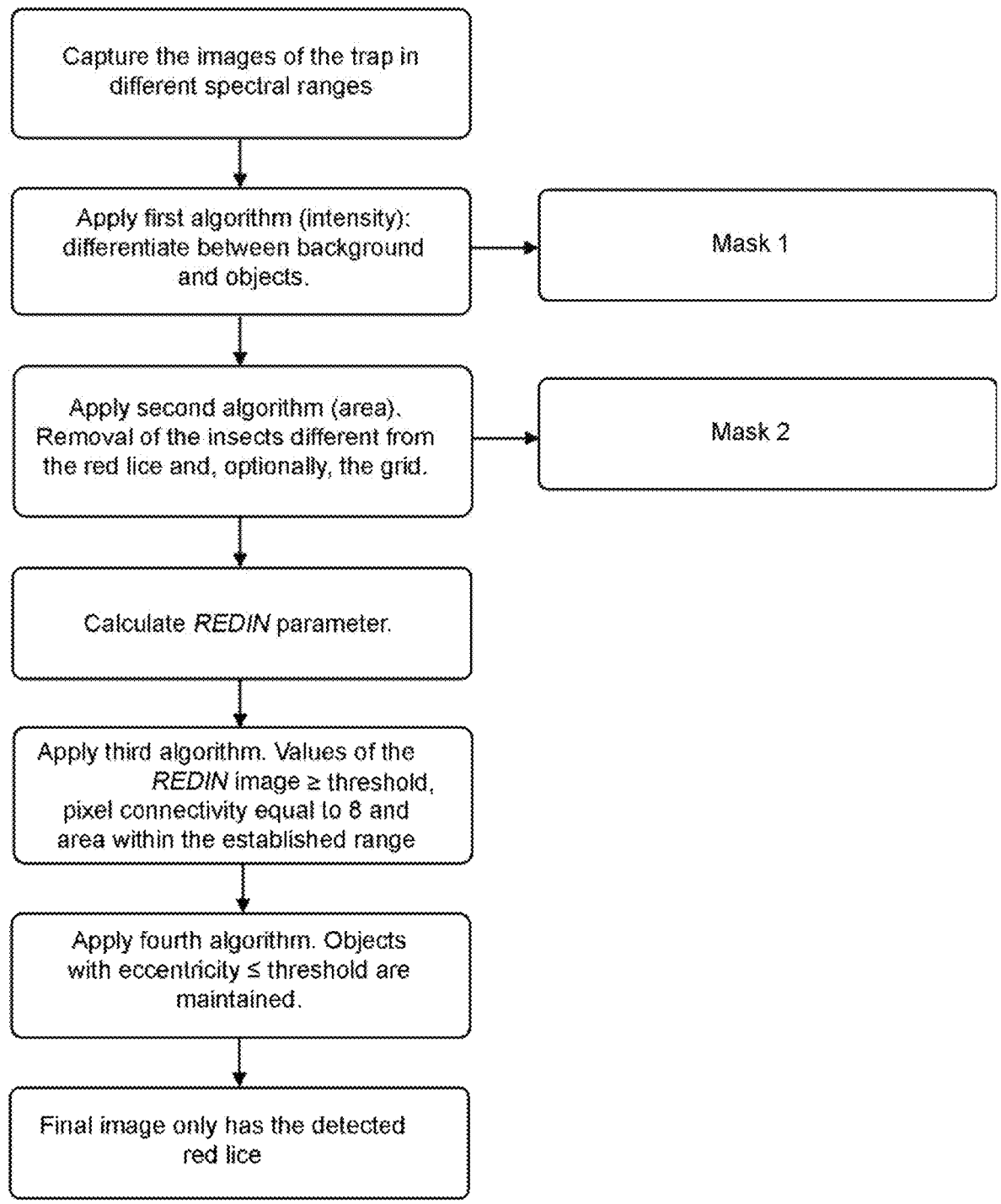
FIG. 7 schematically shows another embodiment of a method for the automatic counting of the California red scale in a trap.

Referring now to FIG. 7, another embodiment of a counting method of the California red scale is shown. In addition to the steps described in FIG. 2, in this embodiment, the third algorithm also comprises applying a pixel connectivity threshold for considering if an insect is a red scale or not and establishing an area range associated with the red scale, that is, based on the morphological properties of the insects to be detected. In an embodiment, a connectivity threshold of 8 is set. Therefore, after the application of the third algorithm, pixels with a REDIN value 3 and a connectivity of 8 will be considered red scale if they present an area within the established range. It should be noted that in other embodiments other REDIN values could be applied. The connectivity is applied to each pixel and it is assessed if this and its 8 neighbouring pixels present a REDIN value equal to or greater than the set threshold; if they do and they jointly form an area within the established range, they are counted as red scale and if not, they are discarded.

Likewise, the detected objects are also mistakenly filtered as red scale because they have a similar size. To that end, a fourth algorithm is applied based on the eccentricity. This way, elongated insect remains are removed, such as legs usually are (maximum eccentricity~1). Eccentricity is defined as the ratio of the distance between a focal point of an ellipse and its major axis, with values comprised between 0 (circle) and 1 (line). In an embodiment, the more elongated objects are removed from the image, with an eccentricity greater than 0.95, which are assigned a minimum intensity or digital value (0), whereas the rest of the pixels are assigned a maximum value (1).

In an embodiment, prior to the processing of the acquired images for carrying out the counting of the insects, it is necessary to condition them so that their intensity levels are comparable. In a first approach, this can be achieved by means of the following reflectance calculation from the intensity values of each pixel of the captured spectral images:

$$I_F(i, j) = k \cdot \frac{I(i, j) - I_D(i, j)}{I_W(i, j) - I_D(i, j)},$$

wherein $I_F(i,j)$, $I(i,j)$, $I_D(i,j)$, $I_W(i,j)$, are the pixel (i,j) intensities of the conditioned final spectral image, an original spectral image of the trap 13, a dark image taken with the illumination device/s 11 turned off and an spectral image of a reference target (white sample with a high spectral reflectance in all of the wavelengths), respectively. The use of the dark image allows to remove the possible noise generated by the acquisition system 10 electronics. On the other hand, the capture of the reference target image is used to compensate for the small unevenness of the illumination in the trap 13 plane. The reference target calibration in terms of spectral reflectance (or equivalent) is included in k. This equation is applied for each of the captured spectral images to the different spectral ranges considered.

As an alternative to this first approach, the reference target and the dark image measurements can be omitted although, to guarantee that the differences in terms of intensity between the acquired (raw) images at different wavelengths are due to the insects themselves, it is necessary to carry out an initial calibration of the acquisition system 10 which consists in setting the acquisition parameters (exposure time, aperture of the lens, etc.) equal for all the quasi-monochromatic spectral ranges (wavelengths) used, and regulating the output of each illumination device 11 such that the average digital level of the image of a uniform white sample be the same when the trap 13 is illuminated at different wavelengths. With the same objective, another alternative is setting the output of the illumination device/s 11 but varying the acquisition parameters of the acquisition system 10 (for example, the exposure time) for each of the quasi-monochromatic spectral ranges used.

The proposed invention can be implemented in hardware, software, firmware or any combination thereof. If it is implemented in software, the functions can be stored on or be coded such as one or more instructions or codes in a computer-readable medium.

The scope of the present invention is defined in the attached claims.

What is claimed is:

1. A method for the automatic counting of the number of insects in a trap, the method comprising:

acquiring, by an acquisition system, a plurality of spectral images of a trap or of a portion of the trap, the plurality of spectral images being acquired for at least two different quasi-monochromatic spectral ranges, a first quasi-monochromatic spectral range and a second quasi-monochromatic spectral range, after having sequentially illuminated the trap, or portion of the trap, with light at said two different quasi-monochromatic spectral ranges, the second quasi-monochromatic spectral range comprising wavelengths greater than the wavelengths of the first spectral range, and the trap, or portion of the trap, containing a series of objects adhered thereto, the objects including insects of one or several types, and optionally other particles including petals, leaves, dust or other types of dirt; and counting, by a processor, the number of insects of a first type of said insects included in the trap, or portion of the trap, through the detection and differentiation of the insects of said first type taking spectral and morphological parameters thereof into account, said counting comprising:

executing a first algorithm on at least one of the acquired spectral images in one of the two different quasi-monochromatic spectral ranges, wherein the first algorithm comprises applying an intensity threshold to said spectral image, providing a first mask as a result with values equal to 1 for the image pixels corresponding to the background and equal to 0 for the image pixels which comprise objects;

executing a second algorithm on said first mask, wherein the second algorithm comprises applying an area threshold to a number of areas of the first mask with pixel values equal to 0 and assigning a value of 1 to the areas with an area value below said area threshold, providing a second mask as a result;

obtaining a REDIN image by relating on a pixel-by-pixel base intensity values of both acquired spectral images in the quasi-monochromatic spectral range corresponding to short and long wavelengths, respectively;

applying the second mask on the obtained REDIN image, providing a new image; and executing a third algorithm on said provided new image, wherein the objects of the trap, or portion of the trap, with a value of the REDIN image greater than or equal to a set threshold value are considered insects of said first type.

2. The method according to claim 1, wherein the third algorithm also comprises applying a pixel connectivity threshold to the provided new image, establishing an area range associated with the insect of the first type, and using said pixel connectivity threshold for considering if an insect is of the first type or not, as long as its size falls within the established area range.

3. The method according to claim 1, further comprising executing a fourth algorithm, based on eccentricity, wherein the method comprises removing from said new image the objects with an eccentricity value greater than a given eccentricity threshold value.

4. The method according to claim 1, wherein before the counting of the insects of the first type the method comprises applying a conditioning algorithm on the acquired spectral images, wherein the conditioning algorithm comprises:

calculating a number of reflectances of the first type of insects from a number of intensity values of each pixel of the acquired spectral images taking into account pixel intensities of: an original spectral image of the trap, a dark image of the trap and a spectral image of a reference target; or carrying out a calibration of said acquisition system, before the acquisition of the plurality of spectral images, wherein the calibration comprises setting, at least, the same acquisition parameters of the acquisition system for said two different quasi-monochromatic spectral ranges.

5. The method according to claim 1, wherein the first algorithm comprises the Otsu, entropy or k-mean methods.

6. The method according to claim 1, wherein the first algorithm is carried out using the spectral image corresponding to the first quasi-monochromatic spectral range.

7. The method according to claim 1, wherein the illumination and the acquisition are carried out in a direction perpendicular to the trap, or portion of the trap, or with a certain angle relative to the trap, or portion of the trap.

8. The method according to claim 1, wherein the first type of insect is the California red scale.

9. The method according to claim 1, wherein the first quasi-monochromatic spectral range is comprised between 300-500 nm and the second quasi-monochromatic spectral range is comprised between 600-900 nm.

10. A system for the automatic counting of the number of insects in a trap, comprising:

a trap which contains a series of objects adhered thereto, wherein the objects include insects of one or several types, and optionally other particles including petals, leaves, dust or other types of dirt;

an illumination device configured to sequentially emit light towards the trap, or towards a portion of the trap, in at least two quasi-monochromatic spectral range or at least two illumination devices configured to sequentially emit light towards the trap, or towards a portion of the trap, in at least one quasi-monochromatic spectral range;

an acquisition system, operatively connected to said illumination device(s), and configured to acquire a plurality of spectral images of the trap, or of the portion of the trap, wherein the plurality of spectral images are acquired for at least two different quasi-monochromatic spectral ranges, a first quasi-monochromatic spectral range and a second quasi-monochromatic spectral range, the second quasi-monochromatic spectral range comprising wavelengths greater than the wavelengths of the first spectral range; and a computing unit including one or more processors and at least one memory, wherein said one or more processors are adapted to count the number of insects of a first type of said insects included in the trap, or portion of the trap, through the detection and differentiation of the insects of said first type taking spectral and morphological parameters thereof into account by means of:

executing a first algorithm on at least one of the acquired spectral images in one of the two different quasi-monochromatic spectral ranges, wherein the first algorithm comprises applying an intensity threshold to said spectral image, providing a first mask as a result with values equal to 1 for the image pixels corresponding to the background and equal to 0 for the image pixels which comprise objects;

executing a second algorithm on said first mask, wherein the second algorithm comprises applying an area threshold to a number of areas of the first mask with pixel values equal to 0 and assigning a value of 1 to the areas with an area value below said area threshold, providing a second mask as a result;

obtaining a REDIN image by relating on a pixel-by-pixel base intensity values of both acquired spectral images in the quasi-monochromatic spectral range corresponding to short and long wavelengths, respectively;

applying the second mask on the obtained REDIN image, providing a new image; and executing a third algorithm on said provided new image, wherein the objects of the trap, or portion of the trap, with a value of the REDIN image greater than or equal to a set threshold value are considered insects of said first type.

11. The system according to claim 10, further comprising one or more polarizers arranged in front of at least one of the acquisition system or the illumination device(s).

12. The system according to claim 10, further comprising a scanning system, operatively connected to at least one of the illumination device(s) or the acquisition system, to carry out a sequential scanning of other portions of the trap.

13. The system according to claim 10, wherein the first type of insects is the California red scale and wherein the first quasi-monochromatic spectral range is comprised between 300-500 nm and the second quasi-monochromatic spectral range is comprised between 600-900 nm.

14. A non-transitory computer readable medium including code instructions, which, when implemented in a computing device, execute a method according to claim 1.

* * * * *